United States Patent [19]

Iddan

[11] Patent Number: 5,808,292

[45] Date of Patent: Sep. 15, 1998

[54] APPARATUS AND METHOD FOR REMOTE SENSING OF AN OBJECT

[75] Inventor: Gabriel Iddan, Haifa, Israel

[73] Assignee: State of Isreal-Ministry of Defense, Armanent Development Authority-Rafael, Haifa, Israel

[21] Appl. No.: 979,218

[22] Filed: Nov. 26, 1997

Related U.S. Application Data

[63] Continuation of Ser. No. 573,027, Dec. 15, 1995, abandoned.

[30]     Foreign Application Priority Data

Dec. 19, 1994   [IL]   Israel .......................................... 112064

[51] Int. Cl.$^6$ ....................................................... G01J 1/20
[52] U.S. Cl. ..................................... 250/203.1; 250/206.1; 244/3.18
[58] Field of Search .............................. 250/203.1, 203.2, 250/203.4, 206.1; 244/3.16, 3.18

[56]            References Cited

U.S. PATENT DOCUMENTS 5,127,604  7/1992  Klaus, Jr. et al. ................... 250/203.1

5,223,702  6/1993  Conley ................................ 250/203.6
5,500,521  3/1996  Suzuki ................................ 250/208.1
5,521,366  5/1996  Wang et al. ............................ 235/472

OTHER PUBLICATIONS

T.E. Wilson, et al. *Versatile Multi Mode 320X240/256X256 Hybrid InSb Infrared Focal Plane Array With Selectable Snapshot or Rolling Integration*, SPIE vol. 1762 Infrared Technology XVIII (1992), Jan. 1992, one page.

Eric R. Fossum, *Active–pixel sensors challenge CCDs*, laser Focus World, Jun. 1993; p. 83.

*Primary Examiner*—Que Le
*Attorney, Agent, or Firm*—Darby & Darby

[57]            ABSTRACT

A sensing and tracking system is provided which includes a stationary array of sensors, a control system and a stationary lens assembly. The control system activates at least one sensor of the array of sensors and for receiving data therefrom. The stationary lens assembly focusses radiation from at least one object spaced away from the sensing and tracking system on the activated sensor.

20 Claims, 4 Drawing Sheets

APPARATUS AND METHOD FOR REMOTE SENSING OF AN OBJECT

This is a continuation of application Ser. No. 08/573,027, filed Dec. 15, 1995, now abandoned.

FIELD OF THE INVENTION

The present invention relates to sensing and tracking systems generally.

BACKGROUND OF THE INVENTION

Sensing and tracking systems which sense and track objects, such as an aircraft or a missile, are well known in the art. A typical prior art sensing and tracking system is shown in FIG. 1 to which reference is now made.

The system of FIG. 1, referenced generally 10, includes an optical system 12 which includes a sensor 14 which detects light from the intruding object and a lens assembly 16 which focuses the light on the sensor. The term light refers herein not only to the visible part of the spectrum but to any type of electro-magnetic radiation such as Infra-Red (IR) or Ultra-Violet (UV) radiation.

A typical Field Of Regard (FOR) 18, i.e the generally conical space sensed and tracked by the system 10, has a conical angle on the order of tens of degrees, such as 60 degrees. However, due to limitations of conventional sensors, the Field of View (FOV), i.e the part of the FOR to which the system is directed at any particular moment, is typically only of few degrees, such as 3 degrees, in accordance with the desired resolution. Therefore, prior art sensing and tracking systems include a mechanical system, typically comprising a gimble 20 and a motor (not shown), which moves the optical system 12 within the FOR 18.

In order to sense or track an intruding object, the gimble 20 moves the optical system 12 from one FOV to another, for example from the FOV labeled 22 to the one labeled 24. Accordingly, the optical system 12 is shown at the position directed toward FOV 22. It's position when directed toward FOV 24 is indicated by dashed lines.

A drawback of prior art systems, for sensing and tracking, is the dynamic capabilities of the electromechanical moving elements are limited. For example, they vibrate when moving thereby introducing a jitter to the system. Further, the time required for the optical system to move from FOV to FOV depends on the performance quality of the motor which moves the gimble to which the optical system is connected.

SUMMARY OF THE INVENTION

It is therefore a purpose of the present invention to provide a sensing and tracking system with a stationary optical system.

The present inventor has realized that the sensor and the prior art mechanical system which moves the electro-optical system can be replaced with an array of sensors, which is capable of receiving light from a desired wide Field of Regard (FOR), thereby providing a sensing and tracking system with a stationary electro-optical system. The array of sensors are typically random access sensors, and the FOR is typically on the order of tens of degrees.

Further, the present inventor has realized that by activating a portion of the sensors of the array at any time, light is received from an area of the FOR which defines a Field of View (FOV). Furthermore, by activating more than one portion of the sensor array at one time, the system may operate to simultaneously sense and track objects in more than one FOV.

The activation of a portion of the sensors of the array at any time allows the time required for reading data from the array of sensors to be minimized. This is advantageous both for fast tracking of the object and for stabilizing the obtained images of the detected objects against the sensor's jitter.

There is thus provided, in accordance with a preferred embodiment of the present invention, a sensing and tracking system which includes a stationary array of sensors, a control system and a stationary lens assembly. The control system activates at least one sensor of the array of sensors and for receiving data therefrom. The stationary lens assembly focusses radiation from at least one object spaced away from the sensing and tracking system on the activated sensor.

Further, according to a preferred embodiment of the present invention, the control system may produce at least one image from the sensed data. The control system may also activate at least two sensors spaced away one from the other and may produce at least two images representing sensed data from the two spaced away areas, each corresponding to one of the at least two sensors spaced away one from the other. Additionally, the control system preferably includes a register and two sequencers and it may receive sensed data in any desired rate.

Further, according to a preferred embodiment of the present invention, the array of sensors may include an array of random access sensors and the control means may access any one of the random array of sensors in any order. The array of sensors may be an array of Charged Injection Device (CID) sensors, preferably having at least 2000 by 2000 sensing elements.

There is also provided, in accordance with a preferred embodiment of the present invention, a method for employing a sensing and tracking system which includes a stationary array of sensors and a stationary optical system. The method includes the steps of activating at least one sensor of the stationary array of sensors, focusing radiation from at least one object spaced away from the sensing and tracking system on the at least one activated sensor, and receiving the sensed data, preferably at a desired rate.

Additionally, according to a preferred embodiment of the present invention, the method may also include the step of producing at least one image from the sensed data, the step of activating at least two sensors spaced away one from the other, and the step of producing at least two images representing sensed data from two spaced away areas, each corresponding to one of the at least two sensors spaced away one form the other.

Finally, according to a preferred method of the present invention, the method may also include the step of accessing any one of the random array of sensors in any order, preferably by employing a sequencer and two registers.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
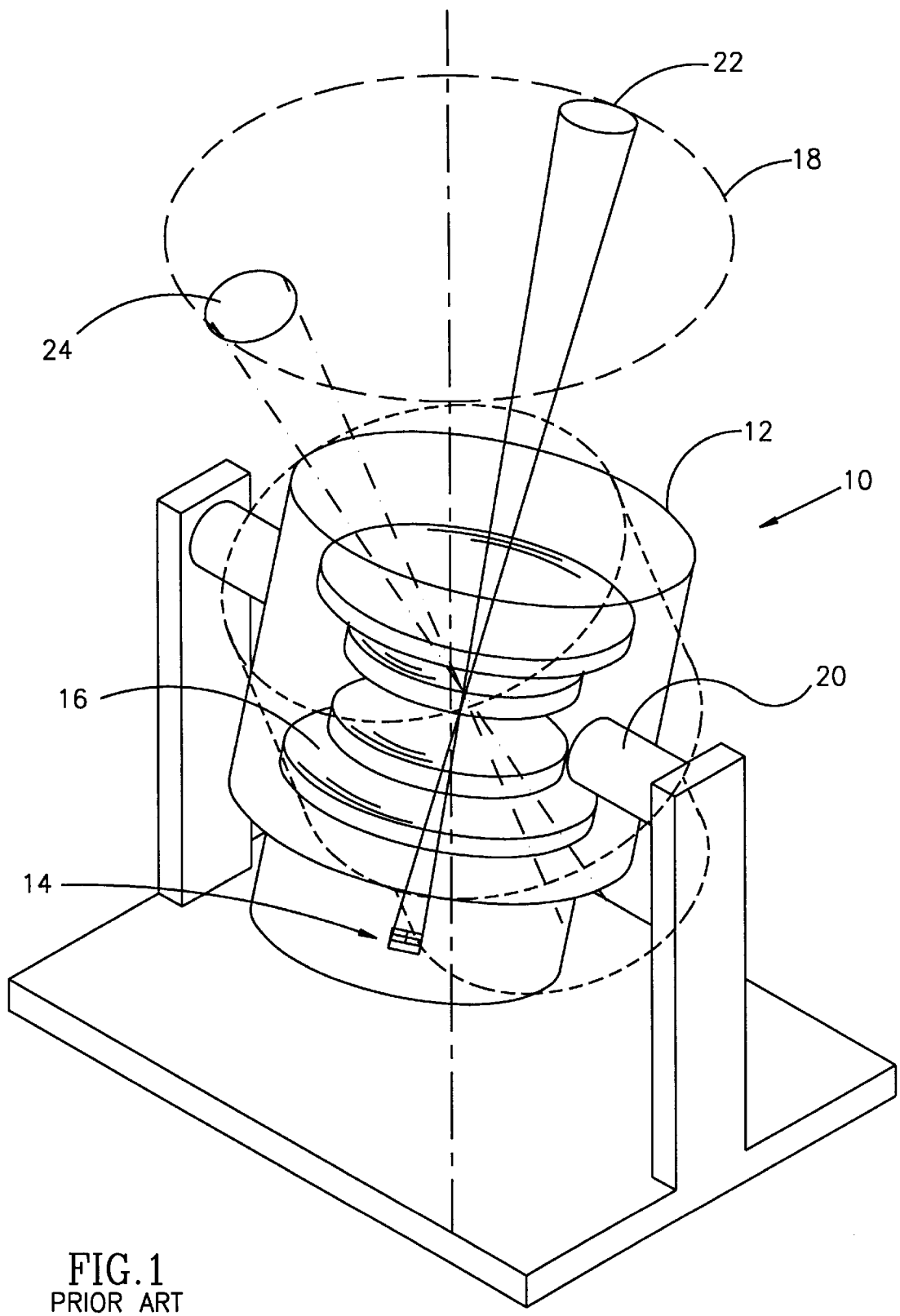
FIG. 1 is a schematic isometric illustration of a prior art sensing and tracking system.
Figure 2:
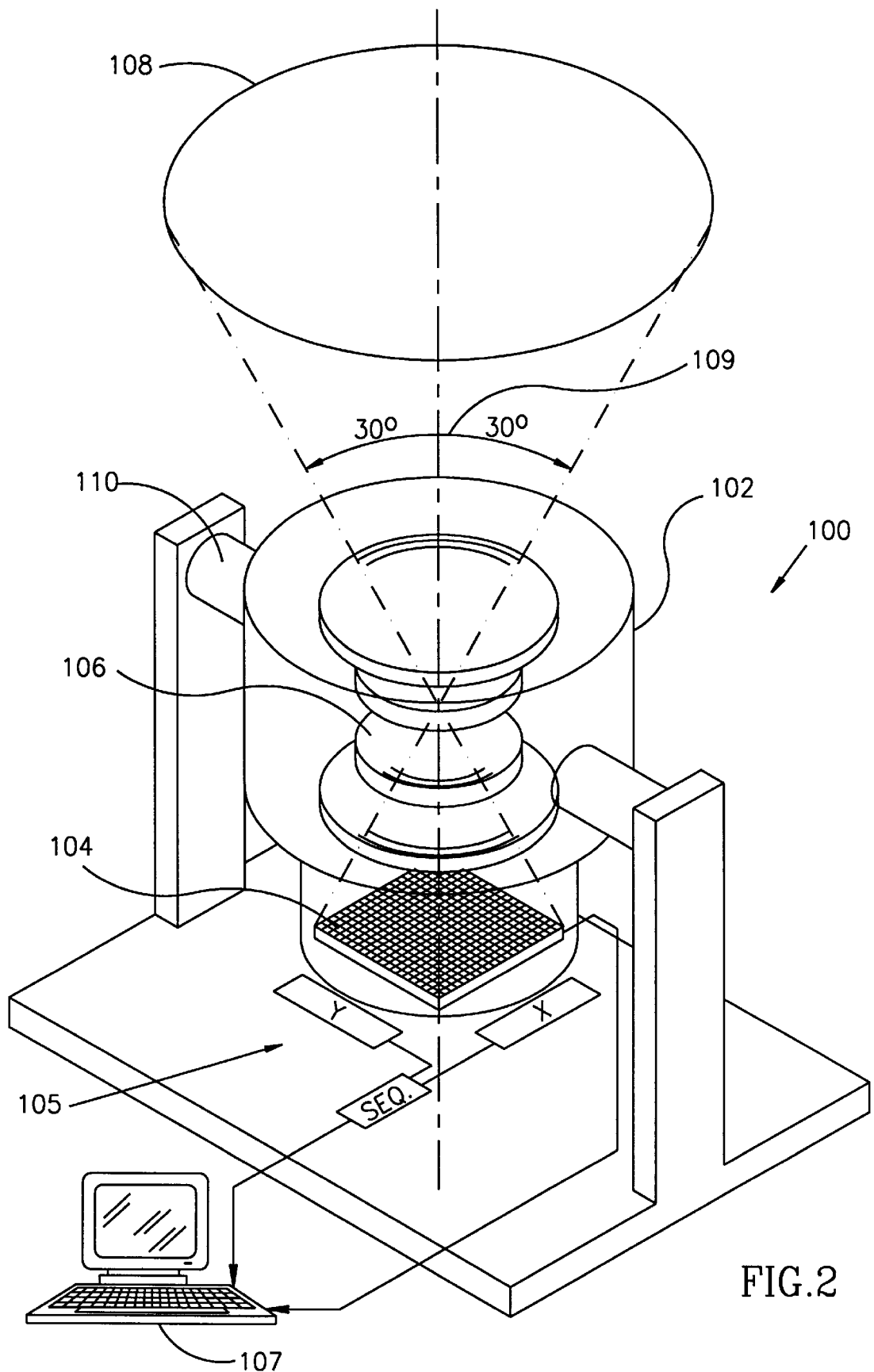
FIG. 2 is a schematic isometric illustration of a sensing and tracking system constructed and operative according to a preferred embodiment of the present invention.

Reference is now made to FIG. 2 which is a schematic isometric illustration of a sensing tracking system constructed and operative according to a preferred embodiment of the present invention. The system, referenced generally 100, preferably comprises an optical system 102 which comprises an array of sensors 104, capable of detecting light from an object spaced away from the system 100 in its Field of Regard (FOR) 108. The system 100 also comprises a lens assembly 106 which focuses the light from the object on the array of sensors 104. The system 100 also includes a control system 105 for controlling the operation of the optical system 102 as described in more detail hereinbelow, and a computer 107. The computer 107 receives and processes data detected by the array of sensors 104, via the control system 105, and also controls the operation of the control system 105.

The system 100 preferably senses and tracks objects within a FOR with a conical angle on the order of tens of degrees, such as 60 degrees as shown for the FOR 108 by reference numeral 109. In contrast to prior art systems where the optical system is moved from one Field Of View (FOV) to another within the FOR, according to the present invention, the optical system 102 is fixed in one location with respect to the FOR 108 and the FOV's are defined by activating a desired portion of the array of sensors 104 at a time.

Alternatively, the system 100 operates to sense and track objects in two or more FOVs simultaneously by activating two different parts of the array of sensors 104 as described in detail hereinbelow.

Preferably, the array of sensors 104 comprises an array of random access sensors, such as an array of Charge Injection Devices (CID) which operate in the visible part of the spectrum. Typically, the array comprises at least 2000×2000 elements and preferably 5000×5000 elements. An example of such an array is available in the CID camera, manufactured and sold by CID Technologies Ltd. of Liverpool, England.

Alternatively, the array of sensors 104 may be any suitable array of random access Charge Coupled Device (CCD) array or an infra Red (IR) sensitive array.

The lens assembly 106 preferably comprises any suitable lens assembly which provides a wide angle panoramic view. Such lenses are well known in the art and are described, for example, in the book *"Photographic Optics"* by A. Cox, published by Focal Press of London, England, the content of which is incorporated herein by reference.

Figures 3A, 3B:
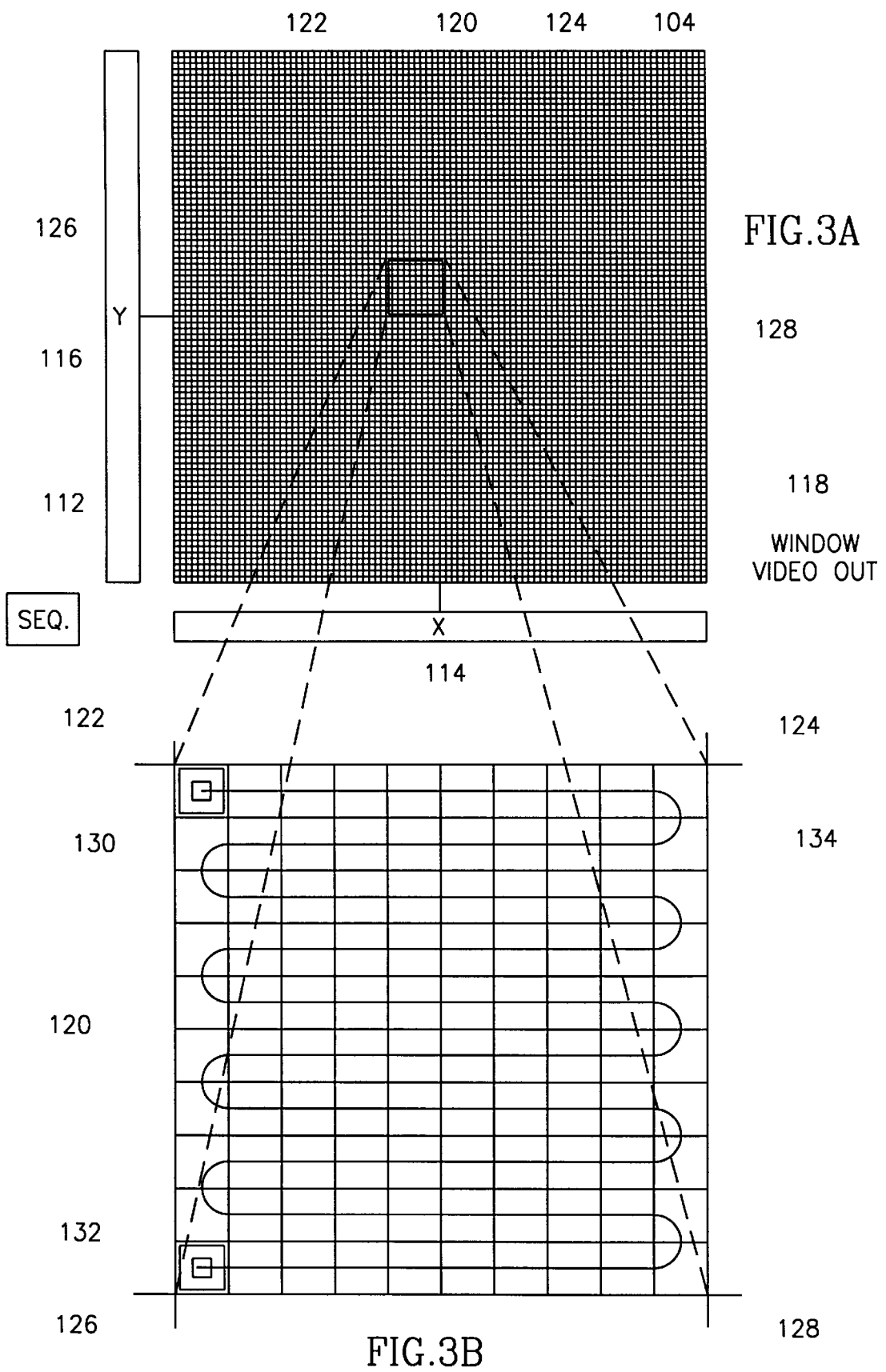
FIGS. 3A and 3B are schematic illustrations of a sensor array structure and a detailed structure of a portion thereof, respectively.

According to one preferred embodiment of the present invention, the system 100 activates a portion of the array elements of optical sensor 104 at a time, as shown in FIGS. 3A and 3B to which reference is now made.

FIG. 3A schematically illustrates the array of sensors 104 and its control system. The control system of the array of sensors 104 preferably comprises a sequencer 112 and two registers, an X register 114 and a Y register 116. The sequencer 112 is preferably connected to the computer 107 (FIG. 2).

It is a particular feature of the present invention that the sensors of the array of sensors 104 are random access sensors, such as an array of CID sensors. Therefore, the sequencer 112 may generate any address, i.e. an X and Y coordinate, and any sequence of not necessarily neighboring addresses. In the non-limiting example of FIG. 3A, the following four sensors are addressed in order to define a portion of the sensor array 120, sensor 122 with the coordinated (Xi, Yj,) sensor 124 with the coordinates (Xi+a,Yj,), sensor 126 with the coordinates (Xi, Yj+b) and sensor 128 with a coordinates (Xi+a,Yj+b).

It will be appreciated that the rate by which data can be retrieved from the full array of sensors is relatively slow and therefore, by activating only a portion thereof at a time, the computer 107 can process the received data. The amount of data from the desired FOV may be comparable to the amount of data retrieved from the entire sensor of prior art systems and therefore, can be utilized in place of the prior art sensors. The amount of received data is also compatible with the frequency of typical monitors (not shown) on which the sensed FOV may be displayed.

The obtained displayed images of the FOV can be stabilized either in a closed loop manner or in an open loop manner. In the closed loop manner, data is retrieved from the FOV at a high rate, such as 300 frames per second. By averaging over a number of such fast read images, each of which represents an effectively stationary image, the signal to noise ratio can be improved, thereby minimizing blurring. In the open loop manner, a background jitter rate can be determined by employing a rate sensor (not shown), such as a rate gyro or a number of accelerometers, and the center of the next FOV can be accordingly shifted.

It is a particular feature of the present invention that the system 100 can detect an object at a slow or a fast rate as desired. By activating a smaller number of sensors of the array of sensors, the rate by which data is retrieved can be increased, thereby allowing faster tracking.

In the non-limiting example of FIG. 3B, a matrix of 10 by 10 CID sensors is shown for simplicity. Two of the sensors 130 and 132 are referenced. The sequence that the sequencer 112 generates for activating the sensors within the addressed region of the array 104 is shown by the meandering line 134. This sequence describes the order by which the sensors are addressed in the scanning mode. If an object is sensed, the system 100 may switch to a tracking mode in which the sequencer 112 may generate a sequence according to the direction of the object within the FOR 108 (FIG. 2).

Figure 4A:
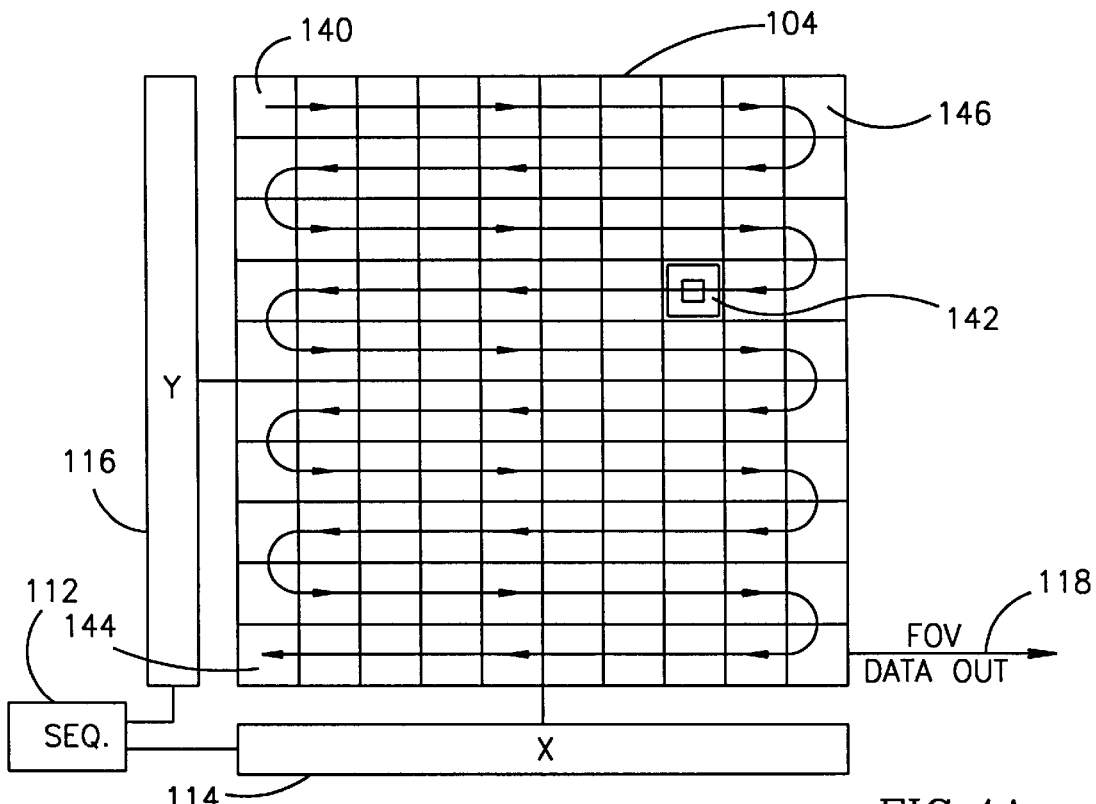
FIG. 4A is a schematic illustration of the sensor array of the system of FIG. 2 in one mode of operation.
Figure 4B:
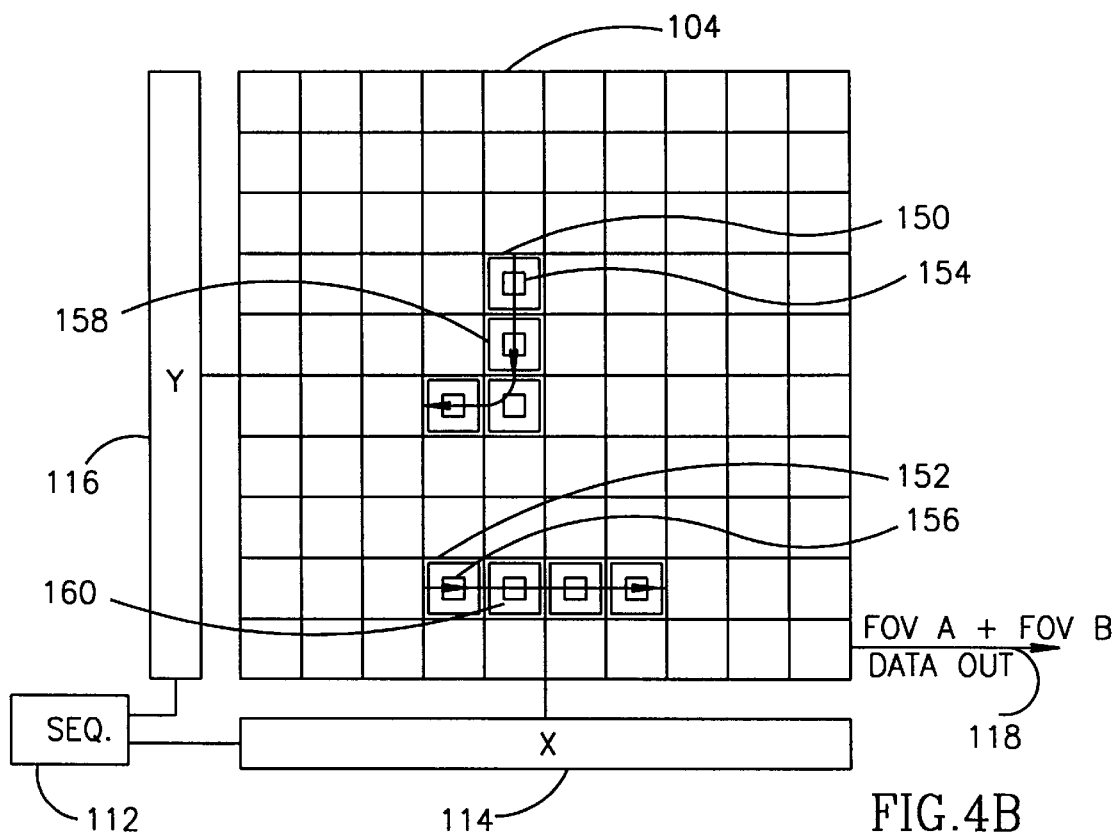
FIG. 4B is a schematic illustration of the sensor array of the system of FIG. 2 in a second mode of operation.

Reference is now made to FIGS. 4A and 4B which illustrate two modes of operation of the system 100. In the non-limiting example of FIG. 4A, portions of the array 104 of equal size, 140, 142 and 144 are shown. For example, for a sensor array of 2000 by 2000 CID sensor elements which is directed to a FOR of 60 degrees, each of these portions corresponds to a FOV of 6 degrees which is comparable to that of prior art systems.

According to the preferred embodiment of FIG. 4A, the FOR 108 (FIG. 2) can be scanned by activating one of the FOVs at a time starting from the portion of the array 140 through the portion 142 and ending with the portion 144 in a sequence indicated by the meandering line 146. In each one of the portions of the array of sensors 104 such as portions 140, 142 and 144, the sensors are addressed as described and shown in FIG. 3B hereinabove.

According to a second preferred embodiment of the present invention, as illustrated in FIG. 4B, more than one portion of the array of sensors 104 may be activated simultaneously, thereby scanning and tracking in more than one FOV of the FOR 108 at a time. For example, both sensor elements 150 and 152 may be addressed by the sequencer 112 via the registers 114 and 116 in order to define two different portions 154 and 156, which correspond to two different FOVs. Then, the system 100 may proceed sensing and tracking two regions in the FOR 108 by simultaneously activating the portions neighboring to portions 154 and 156, such as portions 158 and 160, respectively, which correspond to two FOVs neighboring to the FOVs corresponding to the portions 154 and 156.

It will be appreciated by persons skilled in the art that the present invention is not limited to what has been particularly shown and described hereinabove. Rather, the scope of the present invention is defined only by the claims that follow:

I claim:

1. A sensing and tracking system comprising;
   a. a stationary array of sensors;
   b. a control system for activating a portion of said array of sensors at a time so as to sense data from a different field of view which forms part of a field of regard a plurality of times, each time said control system activates a different portion of said plurality of sensors so as to provide tracking pattern within said field of regard; and
   c. a stationary lens assembly for focusing radiation from at least one object in said field of regard on said activated portion of said stationary array of sensors, thereby sensing and tracking said object.

2. A system according to claim 1 wherein said control system also operates to produce at least one image from said sensed data.

3. A system according to claim 1 wherein said control system activates at least two sensors spaced away one from the other.

4. A system according to claim 3 wherein said control system also operates to produce at least two images representing sensed data from two spaced away areas, each corresponding to one of said at least two sensors spaced away one from the other.

5. A system according to claim 1 wherein said array of sensors include an array of random access sensors.

6. A system according to claim 5 wherein said control system is capable of accessing any one of said random array of sensors in any order.

7. A system according to claim 1 wherein said array of sensor include an array of Charged Injection Device (CID) sensors.

8. A system according to claim 7 wherein said CID comprises an array of at least 2000 by 2000 sensing elements.

9. A system according to claim 1 wherein said control system includes a sequencer and two registers.

10. A system according to claim 1 wherein said control system operates to receive data from the activated sensors at a desired rate.

11. A method for employing a sensing and tracking system comprising the steps of:
    a. activating a portion of said stationary array of sensors at a time so as to sense data from a different field of view which forms part of a field of regard a plurality of times, each time said control system activates a different portion of said plurality of sensors so as to provide a tracking pattern within said field of regard; and
    b. focusing radiation from at least one object in said field of regard on said activated portion of said stationary array of sensors thereby sensing and tracking said object.

12. A method according to claim 11 further comprising the steps of producing at least one image from said sensed data.

13. A method according to claim 11 further comprising steps of activating at least two sensors spaced away one from the other.

14. A method according to claim 13, comprising steps of producing at least two images representing sensed data from two spaced away areas, each corresponding to one of said at least two sensors spaced away one from the other.

15. A method according to claims 11 wherein said array of sensors include an array of random access sensors.

16. A method according to claim 15 further comprising the steps of accessing any one of said random array of sensors in any order.

17. A method according to claims 11 wherein said array of sensors include an array of Charged Injection Device (CID) sensors.

18. A method according to claim 17 wherein said CID comprises an array of at least 2000 by 2000 sensing elements.

19. A method according to claim 11 comprising the steps of employing a sequencer and two registers for accessing any one of said array of sensors.

20. A method according to claim 11 comprising the steps of receiving data from the activated sensors at a desired rate.

* * * * *